$\begin{array}{c}\text{US007057714B2}\end{array}$

(12) United States Patent
Fredin et al.

(10) Patent No.: US 7,057,714 B2
(45) Date of Patent: Jun. 6, 2006

(54) METHOD AND SYSTEM FOR MEASURING OPTICAL SCATTERING CHARACTERISTICS

(75) Inventors: Leif Fredin, Austin, TX (US); Robert Chin, Austin, TX (US); William Hallidy, Austin, TX (US)

(73) Assignee: Systems and Processes Engineering Corporation, Austin, TX (US)

( * ) Notice: Subject to any disclaimer, the term of this patent is extended or adjusted under 35 U.S.C. 154(b) by 0 days.

(21) Appl. No.: 10/636,025

(22) Filed: Aug. 7, 2003

(65) Prior Publication Data

US 2004/0027560 A1    Feb. 12, 2004

Related U.S. Application Data

(62) Division of application No. 09/840,060, filed on Apr. 23, 2001, now Pat. No. 6,606,148.

(51) Int. Cl.
 *G01N 21/00* (2006.01)
(52) U.S. Cl. .................................................. 356/73.1
(58) Field of Classification Search ............ 356/73.1; 250/227.14, 227.15
See application file for complete search history.

(56) References Cited

U.S. PATENT DOCUMENTS

| | | | |
|---|---|---|---|
| 4,355,898 A | 10/1982 | Dakin | 356/346 |
| 4,495,586 A | 1/1985 | Andrews | 364/487 |
| 4,630,228 A | 12/1986 | Tarczy-Hornoch et al. | 364/576 |
| 4,673,299 A | 6/1987 | Dakin | 374/131 |
| 4,674,872 A | 6/1987 | Wright | 356/73.1 |
| 4,708,471 A | 11/1987 | Beckmann et al. | 356/73.1 |
| 4,794,249 A | 12/1988 | Beckmann et al. | 250/227 |
| 4,823,166 A | 4/1989 | Hartog et al. | 356/44 |
| 5,054,935 A | 10/1991 | Tanabe et al. | 374/131 |
| 5,062,703 A * | 11/1991 | Wong et al. | 356/73.1 |
| 5,094,526 A | 3/1992 | Freud et al. | 356/28.5 |
| 5,102,232 A | 4/1992 | Tanabe et al. | 374/131 |
| 5,113,277 A | 5/1992 | Ozawa et al. | 359/127 |
| 5,196,709 A | 3/1993 | Berndt et al. | 250/458.1 |
| 5,272,334 A | 12/1993 | Sai | 250/227.21 |
| 5,292,196 A | 3/1994 | Iida et al. | 374/131 |
| 5,329,392 A | 7/1994 | Cohen | 359/124 |
| 5,449,233 A | 9/1995 | Sai et al. | 374/161 |

(Continued)

FOREIGN PATENT DOCUMENTS

| | | |
|---|---|---|
| EP | 0320255 | 6/1989 |
| EP | 0403094 | 12/1990 |

OTHER PUBLICATIONS

Derickson et al, Fiber Optic Test and Measurement, 1998, Prentice-Hall, Inc., pp. 423-431.*

(Continued)

*Primary Examiner*—Drew A. Dunn
*Assistant Examiner*—Joshua L Pritchett
(74) *Attorney, Agent, or Firm*—Claude E. Cooke, Jr.

(57) ABSTRACT

A method and system for measuring optical scattering characteristics includes coupling a continuous wave laser excitation signal to an optical fiber. Radiation backscattered by the optical fiber in response to the coupled excitation signal is detected to produce a backscattered radiation signal. The backscattered radiation signal is mixed with the excitation signal to produce a mixed signal. The mixed signal is filtered to reduce the magnitude of frequencies other than conjugate mixing frequencies relative to the conjugate mixing frequencies. The filtered signal is digitized and the magnitude of backscattered radiation from a specific portion of the fiber is calculated based on the digitized signal. The temperature of a specific portion of the fiber can be determined from the magnitude of the backscattered radiation.

2 Claims, 6 Drawing Sheets

U.S. PATENT DOCUMENTS

| | | | |
|---|---|---|---|
| 5,526,109 A | 6/1996 | Johnson | 356/28.5 |
| 5,818,240 A | 10/1998 | Cabot | 324/626 |
| 5,981,957 A | 11/1999 | Cruce et al. | 250/458.1 |
| 6,191,846 B1 | 2/2001 | Opsal et al. | 356/72 |
| 6,771,358 B1* | 8/2004 | Shigehara et al. | 356/73.1 |

OTHER PUBLICATIONS

F.L. Galeener, et al., "The Relative Raman Cross Sections of Vitreous $SIO_2$, $GEO_2$, $B_2O_3$, And $P_2O_5$," Appl. Phys. Lett., vol. 32, No. 1, pp. 34/36.

P. Di Vita, et al., "The Backscattering Technique: Its Field of Applicability in Fibre Diagnostics and Attenuation Measurements," Optical and Quantum Electronics, vol. 11, pp. 17/22, 1980.

P. Healey, "Optical Time Domain Reflectometry—A Performance Comparison of the Analogue and Photon Counting Techniques," Optical and Quantum Electronics, vol. 16, pp. 267/276, 1984.

G.W. Bibby, et al., "Raman Thermometry Using Optical Fibres," Analytical Proceedings, vol. 22, No. 7, pp. 213/214, Jul. 1985.

A.H. Hartog et al., "Distributed Temperature Sensing in Solid/Core Fibres," ELEC Letters, vol., 21, pp. 1061/1062, Nov. 1985.

J.P. Dakin, et al., "Temperature Distribution Measurement Using Raman Ratio Thermometry," SPIE Fiber Optic and Laser Sensors III, vol. 566, pp. 249/256, 1985.

R. Stierlin, et al., "Distributed Fiber/Optic Temperature Sensor Using Single Photon Counting Detection," Applied Optics, vol. 26, No. 8, pp. 1368/1370, Apr. 15, 1987.

J.K.A. Everard, et al., "Distributed Optical Fibre Temperature Sensor Using Spread/Spectrum Techniques," Electronics Letters, vol. 25, No. 2, pp. 140/142, Jan. 19, 1989.

B.K. Garside, et al., "A Photon Counting Optical Time/Domain Reflectometer for Distributed Sensing Applications," SPIE Fiber Optic and Laser Sensors VII, vol. 1169, pp. 89/97, 1989.

M.A. Marcus, et al., "Real/Time Distributed Fiber/Optic Temperature Sensing in the Process Environment," SPIE Chemical, Biochemical, and Environmental Sensors, vol. 1172, pp. 194/205, 1989.

Hewlett/Packard, "HP 8703A Lightwave Component Analyzer: Technical Specifications," Hewlett/Packard, pp. 1/16, 1990.

Z. Zhang, et al., "A Novel Signal Processing Scheme for a Fluorescence Based Fiber/Optic Temperature Sensor," Rev. Sci. Instrum., vol. 62 (7), pp. 1735/1742, Jul. 1991.

P.R. Orrell, et al., "Fiber Optic Distributed Temperature Sensing," First European Conference on Smart Structures and Materials, pp. 151/154, 1992.

Agilent Technologies, "High/Speed Lightwave Component Analysis: Application Note 1550/6," Agilent Technologies, pp. 1/23, 1992.

Hewlett/Packard, "High/Speed Lightwave Component Analysis: Application Note 1550/6," Hewlett/Packard, pp. 1/23, date unavailable.

J. Zou, et al., "Distributed Fiber Optical Temperature Sensor Using Digital Boxcar Integrator," SPIE Measurement Technology and Intelligent Instruments, vol. 2101, pp. 412/414, 1993.

J.S. Namkung, et al., "Fiber Optic Distributed Temperature Sensor Using Raman Backscattering," SPIE, vol. 1819, pp. 82/88, 1993.

J.R. Alcala, et al., "Real Time Frequency Domain Fiberoptic Temperature Sensor," IEEE Transactions on Biomedical Engineering, vol. 42, No. 5, pp. 471/476, May 1995.

M. Hobel, et al., "High/Resolution Distributed Temperature Sensing with the Multiphoton/Timing Technique," Applied Optics, vol. 34, No. 16, pp. 2955/2967, Jun. 1995.

J.P. Dakin, et al., "Distributed Optical Fibre Raman Temperature Sensor Using a Semiconductor Light Source and Detector," Electronics Letters, vol. 21, No. 10, pp. 569/570, 1995.

Hewlett/Packard, "Fiber Optic Test Solutions for Network Installation and Maintenance," Hewlett/Packard, pp. 1/12, 1997.

Lutes, et al., "Swept/Frequency Fiber/Optic Readout From Multiple Sensors and Technical Support Package," NASA Tech Briefs, vol. 21, No. 10, Item #192, pp. 35, and JPL New Technology Report NPO/19725, pp. 1, 1/2, and 1A/6A, Oct. 1997.

Hitachi Cable, Ltd., "FTR: Hitachi Fiber Optic Temperature Laser Radar," Hitachi Cable, Ltd., pp. 1/6, 1999.

Hitachi Cable, Ltd., "FTR Application Data Sheet TD/462C," Hitachi Cable, Ltd., pp. 1/14, date unavailable.

B. Huttner, et al., "Optical Frequency Domain Reflectometer for Characterization of Optical Networks and Devices," COMTEC, vol. 3/99, pp. 20/23, 1999.

Author: R. I. MacDonald,Entitled "Frequency domain optical reflectometer"—Applied Optics/vol. 20, No. 10; May 15, 1981; pp. 1840-1844.

* cited by examiner

METHOD AND SYSTEM FOR MEASURING OPTICAL SCATTERING CHARACTERISTICS

CROSS REFERENCE TO RELATED APPLICATION

This patent application is a divisional of, and claims priority to, commonly owned U.S. patent application Ser. No. 09/840,060, filed Apr. 23, 2001, entitled, "Method and System for Measuring Optical Scattering Charateristics," by Leif Fredin, Robert Chin and William Hallidy, which will issue as U.S. Pat. No. 6,606,148 on Aug. 12, 2003, and which is incorporated herein by reference for all purposes.

TECHNICAL FIELD OF THE DISCLOSURE

The present disclosure relates in general to optical system monitoring, and, more particularly, to a method and system for measuring optical scattering characteristics.

BACKGROUND

Optical fibers increasingly constitute the chief means for transmitting information through the world's telecommunications network. Certain characteristics of an optical fiber can also be used to generate information rather than just transmit it. Specifically, the temperature of an optical fiber affects the amount and wavelength of light that will be scattered in response to a transmitted pulse. Careful measurements of scattered light can therefore be used to determine the temperature at points along an optical fiber. As another example, mechanical stresses on the fiber affect the amount of certain wavelengths of light that will be scattered in response to a transmitted pulse. Once again, measurements of scattered light can yield useful information.

Other optical systems also scatter light in correlation with characteristics of interest. For example, an air-filled region may scatter light in proportion to the density of pollutants or another constituent element of interest. Accurately measuring the extent to which certain wavelengths or ranges of wavelengths of light are scattered provides information about other characteristics of the system.

In a conventional method a time-limited pulse of light with an electromagnetic spectrum of average wavelength $\lambda$ is produced at an excitation source and sent through an optical fiber. When the excitation source is a laser, the electromagnetic spectrum is often very narrow and is referred to in shorthand as a single wavelength. As the pulse traverses the fiber, backward scattered light is produced. Three types of backward scattered light, among others, are of interest: Stokes light, anti-Stokes light, and Rayleigh light. Stokes and anti-Stokes light are collectively referred to as Raman light. Stokes light constitutes an electromagnetic spectrum having an average wavelength greater than $\lambda$. Anti-Stokes light constitutes an electromagnetic spectrum having an average wavelength less than $\lambda$. Rayleigh light has the same wavelength $\lambda$ as the excitation source. The width of the Stokes and anti-Stokes spectra, as measured by the difference in wavelength between the points of 50% intensity, is often much greater than the width of the time-limited pulse spectra and the Rayleigh light spectra, especially if that pulse is produced by a laser.

Some of the Rayleigh, Stokes, and anti-Stokes light travels to the end of the fiber at which the pulse was introduced, while some is scattered at an angle such that it is absorbed by the cladding of the fiber or escapes. The location from which the backward scattered light originated can be determined by the time between the introduction of the pulse and the receipt of the light. After a pulse is introduced into the fiber, backward scattered light is continuously received and time functions of the total intensity across the Stokes and anti-Stokes spectra can be determined. Under particular circumstances, the temperature of a point in the fiber has a known relationship to the ratio of the anti-Stokes light produced at that point to the Stokes light produced at that point. If, however, the intensity of the excitation per area of the fiber core is too high, non-linear distortions eliminate the temperature proportionality. Increasing the measurement accuracy of Stokes and anti-Stokes intensity as a function of time without introducing non-linear distortion, increases the accuracy of the resulting calculation of temperature as a function of position in the fiber.

U.S. Pat. No. 5,113,277 discloses a Fiber Optic Distributed Temperature Sensor System. The '277 patent contemplates introducing a light pulse from a light source into a fiber. The scattered light is then divided by wavelength spectra with detectors positioned to receive the Stokes light and anti-Stokes light, respectively. The measurements made by the detectors are then introduced into an equation to determine the temperature at each measured distance.

The use of timed pulses of light to detect temperature or mechanical stress can require expensive components. For example, a light source that has sufficient power and produces light of a wavelength that has scattering characteristics allowing for measurements of scattering over a long distance of fiber can be very expensive. Additionally, the electronics necessary to convert the received intensity of back scattered radiation into a digital representation become more expensive as their processing speed increases. Increasing the spatial resolution of the temperature measurements using timed light pulses requires digital representations of back scattered radiation intensity for smaller periods of time. Such representations are only available with the use of faster, and consequently, more expensive electronics. Additionally, high power pulses can cause stimulated emission of Raman light. Such stimulated emission cannot be distinguished from backscattered radiation and renders calculations inaccurate.

The time pulse method disclosed in the '277 patent also uses optical components to screen Rayleigh scattered light from the sensors. Analyzing the characteristics of Rayleigh scattered light can result in useful information indicating possible mechanical stresses in the optical fiber. This information is not available when the wavelengths comprising the Rayleigh scattering are blocked from the sensors.

SUMMARY OF THE INVENTION

A method and system of measuring optical scattering characteristics is disclosed. None of the advantages disclosed, by itself, is critical or necessary to the disclosure.

A system is disclosed for measuring optical scattering characteristics that includes a laser that produces an excitation signal. An optical fiber is coupled to the laser. At least a portion of the excitation signal enters the optical fiber as a coupled excitation signal with a continuous waveform and an amplitude modulated at variable frequencies. A first detector receives radiation backscattered from the coupled excitation signal by the optical fiber. In a more specific embodiment, the coupled excitation signal has a power less than 500 mW. In another more specific embodiment, the optical fiber is a single mode optical fiber.

A method is disclosed for measuring optical fiber characteristics that includes coupling a continuous wave laser excitation signal to an optical fiber. Radiation backscattered by the optical fiber in response to the coupled excitation signal is detected to produce a backscattered radiation signal. The backscattered radiation signal is mixed with the excitation signal to produce a mixed signal. The mixed signal is filtered to reduce the magnitude of frequencies other than conjugate mixing frequencies relative to the conjugate mixing frequencies. The filtered signal is digitized and the magnitude of backscattered radiation from a specific portion of the fiber is calculated based on the digitized signal. In a more specific embodiment, the temperature of a specific portion of the fiber is determined from the magnitude of the backscattered radiation.

It is a technical advantage of the disclosed methods and systems that backscattered radiation from an optical target receiving a variable frequency interrogation signal is detected.

It is also a technical advantage of the disclosed methods and systems that less expensive electronics can be used to monitor variable frequency backscattering.

Another technical advantage of the system and method disclosed is that lower cost excitation sources producing less power can be used to produce accurate results.

Another technical advantage of the system and method disclosed is that a lower power excitation signal can be coupled to a fiber to reduce non-linear distortion.

Another technical advantage of the system and method disclosed is that the temperature at a specific point of the optical target can be determined.

Another technical advantage of the system and method disclosed is that mechanical stresses of an optical fiber can be determined.

Another technical advantage of the system and method disclosed is that the particle density of an air-filled region can be determined.

Another technical advantage of the system and method disclosed is that the frequency difference between the detected reference signal and the detected backscattered radiation can be used to determine the origin of the backscattered radiation.

Another technical advantage of the system and method disclosed is that the backscattering characteristics of single mode fiber can be determined.

Other technical advantages of the present disclosure will be readily apparent to one skilled in the art from the following figures, descriptions, and claims. Various embodiments of the invention obtain only a subset of the advantages set forth. No one advantage is critical to the invention. For example, one embodiment of the present invention may only provide the advantage of detecting backscattered radiation, while other embodiments may provide several of the advantages.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
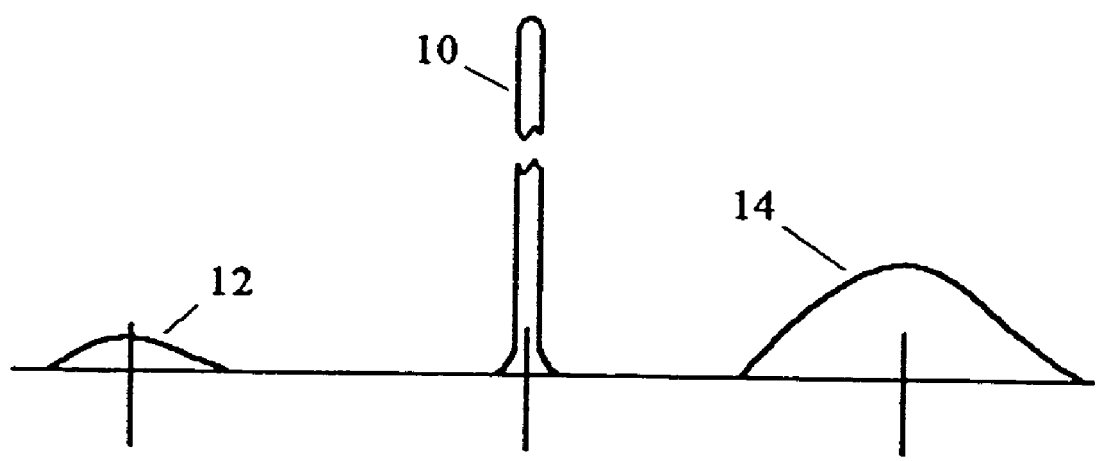
FIG. 1 is a graph of electromagnetic spectra.

FIG. 1 is a graph of electromagnetic spectra. One point in the fiber will reflect some light of the same optical frequency as the light being transmitted, known as Rayleigh scattering 10. Of less intensity are reflections of light at optical wavelengths both longer and shorter than the incident light. The shorter wavelength light 12 is known as anti-Stokes scattering. The longer wavelength light 14, is known as Stokes scattering. The Stokes and anti-Stokes light are collectively known as Raman light. The intensity of each type of scattered light is a function of the intensity of the incident light. If the incident light is amplitude modulated, the amplitude of the backscattered radiation will also be affected. The different types of backscattered radiation are also affected by different characteristics of the fiber. For example, the amount of Rayleigh light scattered at a point in the fiber is related to the mechanical stress of the fiber at that point. The ratio of anti-Stokes light to Stokes light scattered at a point in the fiber is related to the temperature of the fiber at that point.

Figure 2:
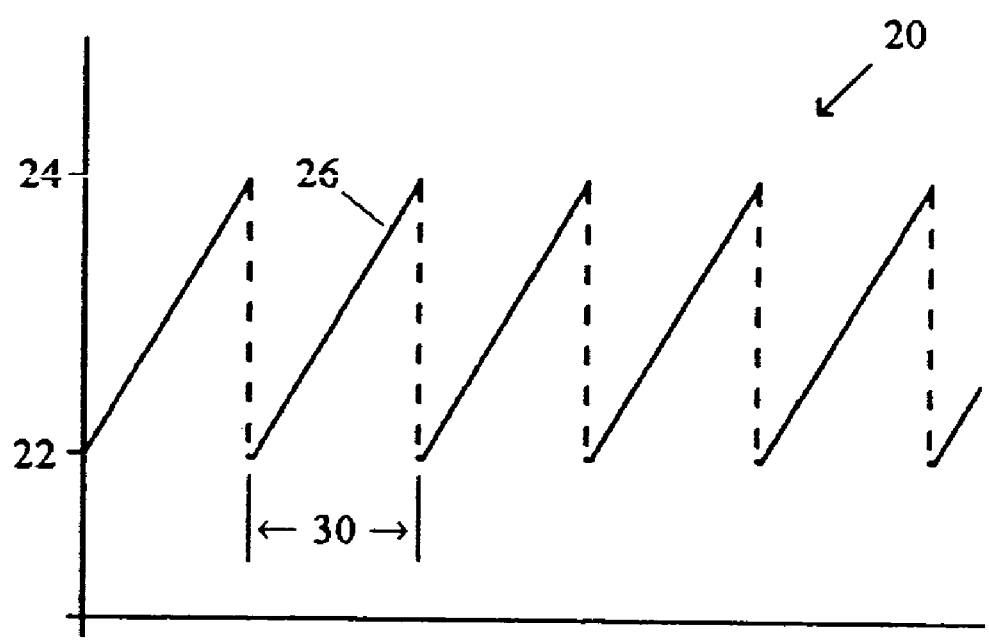
FIG. 2 is a graph of a chirped, variable frequency, modulating signal.

FIG. 2 is a graph of a chirped, variable frequency, modulating signal. The graph shows the frequency of the signal as a function of time. The modulating signal 20 progresses linearly from a minimum frequency 22 to a maximum frequency 24 during a chirp period 30. The slope of the chirp 26 can be determined by dividing the change in frequency (the difference between the maximum 24 and the minimum 22) by the chirp period 30 or duration. The duration of the chirp 30 is preferably longer than the amount of time it takes for light to make a round trip through the fiber or optical target to be interrogated. The greater the proportion of the chirp period 30 to the round-trip time, the greater the proportion of the detected radiation that can be used to measure optical backscattering characteristics.

Figure 3:
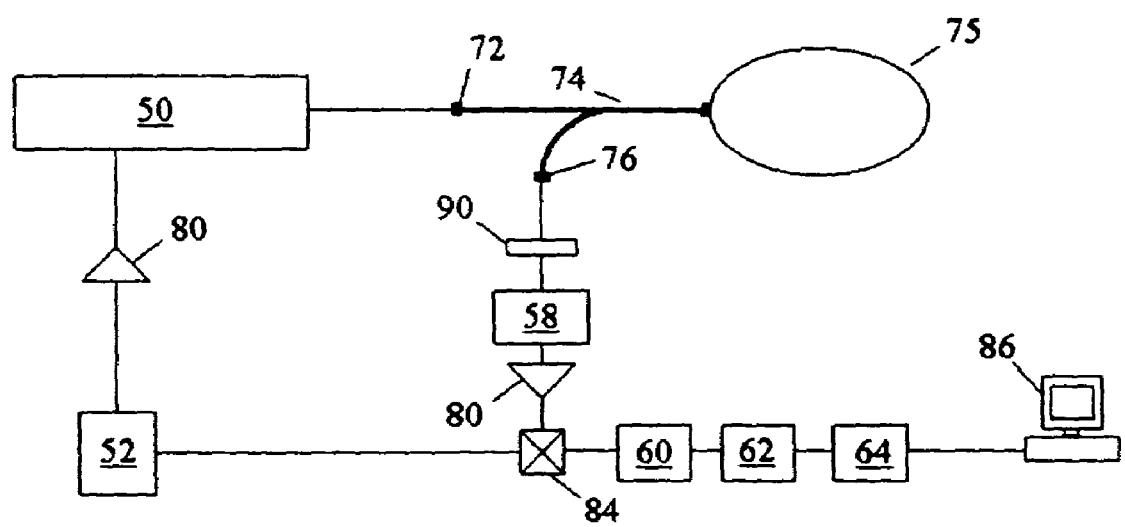
FIG. 3 is a diagram of a system for measuring optical scattering characteristics in accordance with one embodiment of the present invention.

FIG. 3 is a diagram of a system for measuring optical scattering characteristics in accordance with one embodiment of the present invention. A first frequency generator 52 provides a frequency chirped signal in accordance with FIG. 2. The signal is amplified by an amplifier 80 and controls the output amplitude of a laser 50. In alternative embodiments the output of the laser can be directed to an external modulator that is driven by the first signal. The output of laser 50 is a laser excitation signal. A low power laser excitation signal can be used to decrease nonlinear backscattered radiation responses. For example, a power of less than 500mW allows for use of a 1541 nm laser source while reducing nonlinear response. Alternatively, a higher power laser excitation signal could be reduced to less than 500mW by an external modulator or other optical device. The amplitude modulated light is directed to an optical target 75. In one embodiment, an optical fiber 74 is used to direct the amplitude modulated light to the optical target 75. through entrance 72 and exit 76. In one embodiment, an optical fiber is the optical target. The optical fiber can be multi-mode fiber or single-mode fiber. A portion of the backscattered light from the optical target traverses filter 90 and is received by a avalanche photodiode 58. The filter 90 determines the type of backscattered radiation received by the avalanche photodiode 58. For example, the filter 90 may allow only Rayleigh radiation or Stokes radiation depending on the wavelengths that the filter 90 transfers and blocks.

The avalanche photodiode 58 outputs a signal corresponding to the energy of photons received. That signal is amplified by an amplifier 80. A mixer 84 receives the amplified signal together with the modulating signal from the first frequency generator 52. The mixer 84 is a device that produces output signals at the sum and difference frequencies of the input signals. The mixer output signal is provided to a low pass filter 60, an analog-to-digital converter (ADC) 62, and a fast fourier transform (FFT) circuit 64. In an alternate embodiment, the FFT circuit 64 could be replaced by a software-implemented fast fourier operation. The digitized frequency information is then received by a processor 86.

Figure 4:
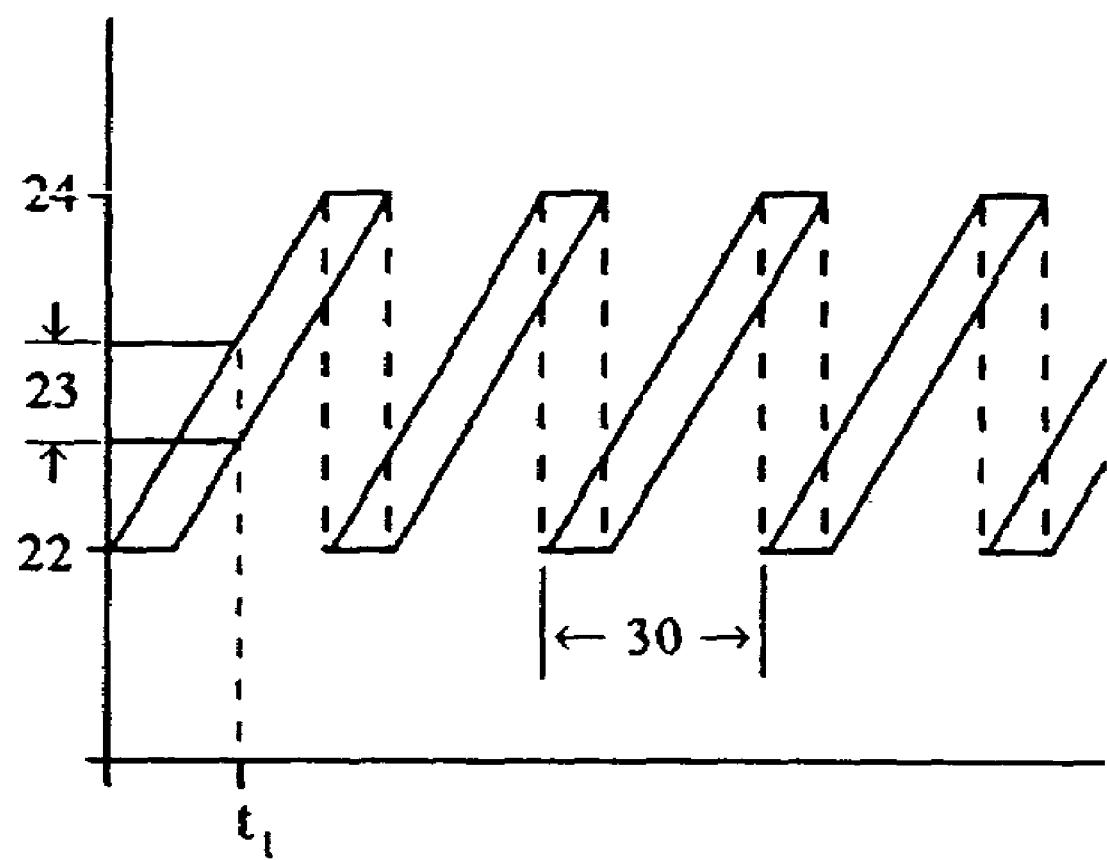
FIG. 4 is a graph of amplitude modulation frequencies of backscattered radiation.

FIG. 4 is a graph of amplitude modulation frequencies of backscattered radiation. A range of backscattered radiation frequencies are received at any particular time. The frequencies range from the minimum chirp frequency 22 to the maximum chirp frequency 24. The received frequencies are periodic over the chirp period 30. For example, at a time t, a range of frequencies 23 are received. The highest frequency was reflected by the nearest point in the optical target and is essentially identical to the current frequency of laser modulation. The lowest frequency was reflected by the furthest point in the optical target and is equal to the laser modulation frequency at a previous time. The time difference in modulation is equal to the time required for the light to traverse the optical target twice. For example, if the optical target is an optical fiber of length L and light travels through the optical fiber at speed c, the lowest frequency of received radiation will be the frequency at which the laser was modulated at a time $$\frac{2L}{c}$$

previous.

An expression for the instantaneous frequency of the chirp is:

$$f(t) = f_0 + \gamma \mathrm{mod}(t,\tau) \qquad \text{Eqn. 1}$$

where $f_0$ is the minimum frequency, $\gamma$ is the chirp rate, and $\tau$ is the chirp period. The laser's output power waveform then has the form:

$$P(t) = 0, t < 0$$

$$P(t) = P_0\{1 - m\sin^2[\phi(t)/2]\}, 0 \le t \qquad \text{Eqn. 2}$$

with $$\phi(t) = 2\pi \int f(t) dt \qquad \text{Eqn. 3}$$

where $\phi(t)$ is the phase of the waveform. The excitation shown in Eqn. 2 can be rewritten as:

$$P(t) = P_0\left\{1 - \frac{1}{2}m + \frac{1}{2}m\cos[\phi(t)]\right\}. \qquad \text{Eqn. 4}$$

The time span of the dashed regions in FIG. 4 is just $$\frac{2L}{c}.$$

In one embodiment, only data from outside the dashed regions is considered for determining optical backscattering characteristics. In that embodiment, data is available if $$\frac{2L}{c} < \tau.$$

Eqn. 4 shows that the intensity modulation of the backscattered radiation received from the optical target will have both a DC and an AC component. The AC component of the modulation of the received backscattered radiation intensity as a function of time from a fiber of length, L, and absorption coefficient, $\alpha(l)$, can be expressed as an integral over the length of the fiber, after an initial transient period of one round trip time on the fiber, 2L/c:

$$r(t) = \frac{1}{2}mP_0 \int_0^L \exp\left[-2\int_0^l \alpha(l')dl'\right]\cos\left[\phi\left(t - \frac{2l}{c}\right)\right]\sigma(l)dl \qquad \text{Eqn. 5}$$

for $t > \frac{2L}{c}$ where $\sigma(l)$ measures the returned strength, from position l, of the backscattered signal that is trapped in the fiber and c is the speed of light in the fiber. In one embodiment, $\alpha(l)$ is assumed to be a constant, independent of l, so that the interior integral of Eqn. 5 is equal to $\alpha l$. With that assumption the complex return, R(t) can be defined as $$R(t) = \frac{1}{2}mP_0 \int_0^L e^{-2\alpha l} e^{i\phi\left(t - \frac{2l}{c}\right)}\sigma(l)dl \qquad \text{Eqn. 6}$$

so that:

$$r(t) = Re[R(t)]. \qquad \text{Eqn. 7}$$

FIG. 3 illustrates that the real return signal is mixed with the real excitation signal at mixer 84. Because these signals each consist of both an AC and a DC component and because the AC part of each real signal is half the sum of the corresponding complex signal with its conjugate, the real mixed signal contains four types of terms: DC terms from the DC/DC mixing, terms at the original chirp frequencies from the AC/DC mixing, terms at twice the original chirp frequencies from the direct AC mixing ($e^i e^i$ and $e^{-i} e^{-i}$) and low frequency terms from the conjugate mixing ($e^i e^{-i}$ and $e^{-i} e^i$).

In one embodiment, the DC terms are eliminated by coupling only AC from the frequency generator 52 and avalanche photodiode 58 to the mixer 84, for example using a capacitor. The low pass filter 60 eliminates the AC/DC mixing terms and the direct AC mixing terms. The only terms passed in this embodiment to the ADC 62 are the low frequency terms that result from conjugate mixing.

The result of the mixing and filtering may then be written as:

$$M(t) = K e^{-i\phi(t)} R(t) \qquad \text{Eqn. 8}$$

Thus $$M(t) = A \int_0^L e^{-2\alpha l} \sigma(l) \exp\left[-i2\pi \int_{t-\frac{2l}{c}}^{t} f(t') dt'\right] dl \qquad \text{Eqn. 9}$$

where K and A are constants that depend on circuit parameters.

In one embodiment we restrict the acquisition time to $$\frac{2L}{c} \le t \le \tau,$$

resulting in:

$$\int_{t-\frac{2l}{c}}^{t} f(t') dt' = [f_0 + \gamma t]\left(\frac{2l}{c}\right) - \frac{1}{2}\gamma\left(\frac{2l}{c}\right)^2. \qquad \text{Eqn. 10}$$

Writing $f(t) = f_0 + \gamma t$ and substituting $k(t) = \frac{2f(t)}{c}$, we have $$M(t) \equiv \hat{M}(k) = A \int_0^L e^{-2\alpha l} \sigma(l) e^{i\pi\gamma\left(\frac{2l}{c}\right)^2} e^{-i2\pi k l} dl. \qquad \text{Eqn. 11}$$

where the dependence of k on t is implicit. Performing a Fourier transform of $\hat{M}(k)$ yields an expression that can be solved for $\sigma(\hat{l})$.

$$M(\hat{l}) \equiv \int_{-\infty}^{\infty} \hat{M}(k) e^{i2\pi k \hat{l}} dk \qquad \text{Eqn. 12}$$

$$= A e^{-2\alpha \hat{l}} \sigma(\hat{l}) e^{i\pi\gamma\left(\frac{2\hat{l}}{c}\right)^2}, 0 \le \hat{l} \le L$$

However, data is available only over the finite range of time, $$\frac{2L}{c} \le t \le \tau,$$

and over corresponding ranges of f(t) and k(t), where $0 \le k_1 \le k \le k_2$. Thus, for a continuous range of k, we have $$\tilde{M}(\hat{l}, k_1, k_2) \equiv \int_{k_1}^{k_2} \hat{M}(k) e^{i2\pi k \hat{l}} dk \qquad \text{Eqn. 13}$$

which, after some manipulation, yields $$\tilde{M}(\hat{l}, k_1, k_2) = \qquad \text{Eqn. 14}$$

$$A(k_2 - k_1) \int_0^L e^{-2\alpha l} \sigma(l) e^{i\pi\gamma\left(\frac{2l}{c}\right)^2} e^{i2\pi\langle k\rangle(\hat{l}-l)} \cdot \sin c\left[(k_2 - k_1)(\hat{l} - l)\right] dl$$

where $$\langle k \rangle = \frac{1}{2}(k_1 + k_2).$$

If the remaining terms under the integral were slowly varying, the sinc function could be approximated by a Dirac delta function. However, for positive k, we note that $$\langle k \rangle > \frac{1}{2}(k_2 - k_1),$$

so that this condition is not met in practice.

We are only able to collect data for positive frequencies, f(t), so we only have experimental data for positive values of k(t). However, if we examine Eqn. 11 for $\hat{M}(k)$, we see that if the condition $$\pi\gamma(2L/c)^2 \ll 1 \qquad \text{Eqn. 15}$$

is met, then $\hat{M}(-k) \approx \hat{M}^*(k)$, where * indicates complex conjugation. Thus, $\hat{M}(k)$ may be extended by this process, which we call bookmatching, to include negative k. This will permit us to set $\langle k \rangle = 0$ in Eqn. 14. The remaining terms will then vary much more slowly than the sinc function. If we also choose $k_1 = 0$, Eqn. 14 takes the approximate form $$\tilde{M}(\hat{l}, k_2) = \int_{-k_2}^{k_2} \hat{M}(k) e^{i2\pi k \hat{l}} dk \qquad \text{Eqn. 16}$$

$$\approx 2 A k_2 \int_0^L e^{-2\alpha l} \sigma(l) \sin c\left[2k_2(\hat{l} - l)\right] dl$$

$$\approx A e^{-2\alpha \hat{l}} \sigma(\hat{l}), 0 \le \hat{l} \le L$$

where we have approximated $$e^{i\pi\gamma\left(\frac{2l}{c}\right)^2} \approx 1$$

and $2k_2 \text{sinc}[2k_2(l-\hat{l})] \approx \delta(\hat{l}-l)$. The first approximation becomes exact when $\gamma=0$.

When backscattering from the fiber occurs from both discrete and continuous scatterers, the received signal from different locations on the fiber may include a wide dynamic range. In that instance, the contribution in Eqn. 16 from the sidelobes of the sinc function for a discrete scatterer may swamp the distributed scattering signal from nearby locations. In order to reduce this effect, we multiply the mixed signal of Eqn. 11 by a low pass window function, W(k), to produce $$\hat{M}_w(k) = W(k) \cdot \hat{M}(k) \qquad \text{Eqn. 17}$$

By defining W(k) as a real, symmetric function of k, the function $\hat{M}_w(k)$ will satisfy the condition for bookmatching if $\hat{M}(k)$ does.

After bookmatching, we follow the procedures for $\hat{M}_w(k)$ which led to Eqn. 16 for $\hat{M}(k)$ to obtain $$\tilde{M}_W(\hat{l}, k_2) = \int_{-k_2}^{k_2} \hat{M}_W(k) e^{i\,2\pi k \hat{l}} dk \qquad \text{Eqn. 18}$$

$$\approx A \int_0^L e^{-2\alpha l} \sigma(l) W(\hat{l} - l) dl$$

$$\approx A e^{-2\alpha \hat{l}} \sigma(\hat{l}), \; 0 \leq \hat{l} \leq L$$

where W(l) is the Fourier transform of a suitably normalized window function, W(k), chosen to ensure that W(l) approximates the Dirac function.

Typical, non-normalized window functions that we have used include the offset Gauss type $$W_G(k) = 1, \qquad\qquad 0 \leq k < k_0 \qquad \text{Eqn. 19}$$

$$= e^{-a\left(\frac{k-k_0}{k_2-k_0}\right)^2}, \quad k_0 \leq k \leq k_2$$

$$= 0, \qquad\qquad \text{elsewhere}$$

and a generalized raised cosine function $$W_C(k) = 1, \qquad\qquad 0 \leq k < k_0 \qquad \text{Eqn. 20}$$

$$= \left\{\cos\left[\frac{\pi}{2}\left(\frac{k-k_0}{k_2-k_0}\right)\right]\right\}^a, \quad k_0 \leq k \leq k_2$$

$$= 0, \qquad\qquad \text{elsewhere}$$

where $k_0$ and a are parameters that determine the width and rate of decay of the window.

For zero offset, the normalized, bookmatched, Gauss type window function, $W_G$, may be written $$W_G(k) = G(k) \cdot \prod_{k_2}(k) \qquad \text{Eqn. 21}$$

where G(k) is a Gaussian function and $$\prod_{k_2}(k)$$

is the unit step function with support $-k_2 \leq k \leq k_2$. The Fourier transform of this widow is given by $$W_G(l) = \hat{G}(l) \otimes 2k_2 \cdot \text{sinc}(2k_2 l) \qquad \text{Eqn. 22}$$

where $\hat{G}(l)$ is also a Gaussian function and $\otimes$ denotes a convolution.

The central peak of a sinc function is twice as wide as each of its sidelobes. We can choose G(k) in Eqn. 21 so that the width of $\hat{G}(l)$ matches that of the sinc's central peak. From Eqn. 22, this allows us to significantly reduce the sidelobes of $W_G(l)$ in comparison with those of the sinc function while minimizing the spread of its central peak.

Data will normally be collected in discrete samples at equal intervals rather than continuously. Furthermore, it is also desirable to avoid taking zero frequency (DC) data. By choosing sample times so that the least sample frequency is half the frequency interval between samples, we arrive, after bookmatching, with a set of equally spaced samples, $$\left\{\hat{M}(k_n): -N \leq n \leq N-1\right\}, \text{where } k_n = \left(n + \frac{1}{2}\right)\delta k \text{ with } \delta k = \frac{2\delta f}{c},$$

frequency interval $\delta f = \gamma \delta t$ and sample time interval $\delta t$.

Discrete Fourier transform of the data yields $$\tilde{M}(\hat{l}, k_N) = \sum_{n=-N}^{N-1} \hat{M}(k_n) e^{i 2\pi k_n \hat{l}} \delta k \qquad \text{Eqn. 23}$$

$$\approx A\delta k \int_0^L e^{-2\alpha l} \sigma(l) \sum_{n=-N}^{N-1} e^{i 2\pi k_n (\hat{l}-l)} dl$$

$$= A\delta k \int_0^L e^{-2\alpha l} \sigma(l) \left\{\frac{\sin[\pi 2k_N(\hat{l}-l)]}{\sin[\pi \delta k(\hat{l}-l)]}\right\} dl$$

where $$k_N = \frac{2f_{\max}}{c}.$$

The function in curly brackets is called the array factor. It will approximate a Dirac delta function over the region of integration provided the following conditions are met:

$$2\Box k_N L \gg 1 \qquad \text{Eqn. 24}$$

and $$\Box\Box k L \ll 1 \qquad \text{Eqn. 25}$$

If these constraints are satisfied, we find $$\tilde{M}(l k_N) \approx A e^{-2\alpha l} \sigma(l), \; 0 < l < L \qquad \text{Eqn. 26}$$

in agreement with our earlier result from Eqn. 16, where the right hand side Eqn. 26 is independent of $k_N$. If we relax the assumption that α(l) is a constant, independent of l, that was made in simplifying Eqn. 5 to Eqn. 6, we find $$\tilde{M}(\hat{l}, k_N) \approx A \exp\left[-2\int_0^{\hat{l}} \alpha(l)\,dl\right]\sigma(\hat{l}), \; 0 \leq \hat{l} \leq L \qquad \text{Eqn. 27}$$

Thus, we see that if the constraints of Eqn. 15, Eqn. 24 and Eqn. 25 are satisfied, the transformed, low pass part of the mixed signal allows us to determine the signal backscattered from fiber as a function of position, l, along the fiber. We also observe the expected exponential decay of the return signal with l.

Figure 5:
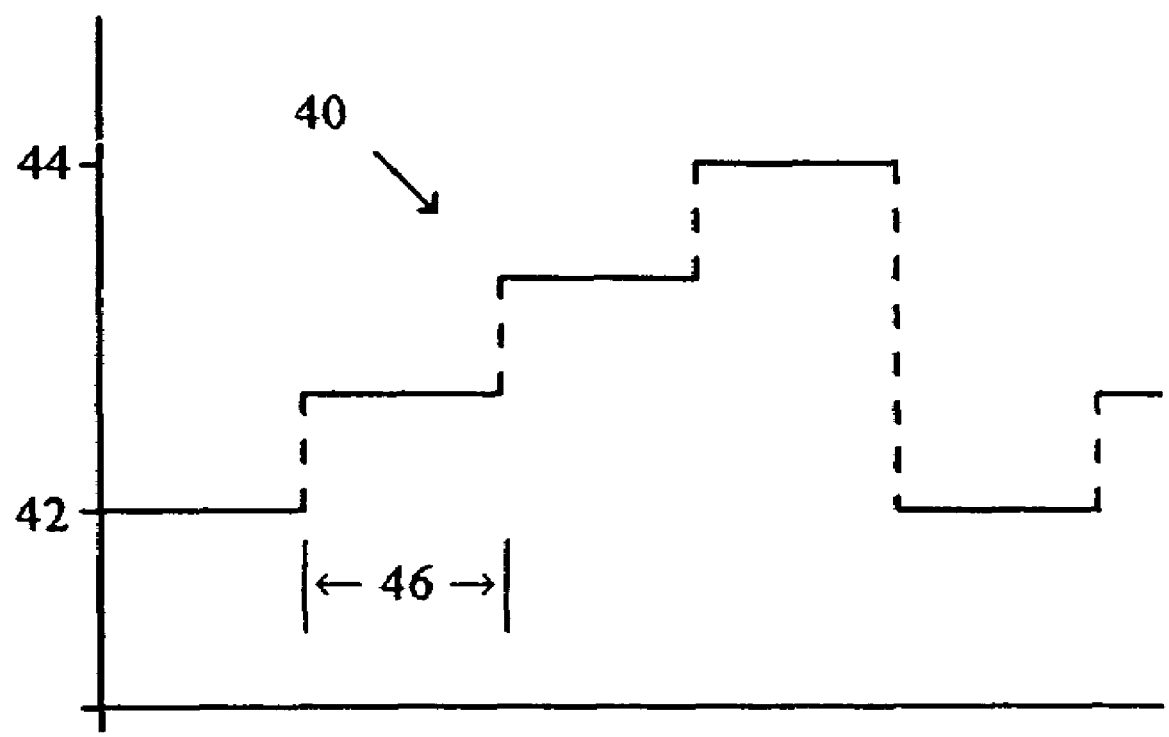
FIG. 5 is a graph of a stepped, variable frequency, modulating signal.

FIG. 5 is a graph of a stepped, variable frequency, modulating signal. Like the chirped signal 20, the frequency of the stepped signal 40 varies with time. Unlike the chirped signal 20, the stepped signal 40 varies discretely, not continuously. The stepped signal 40 progresses from a minimum frequency 42 through discrete frequency steps to a maximum frequency 44. Each step has a set duration 46.

Figure 6:
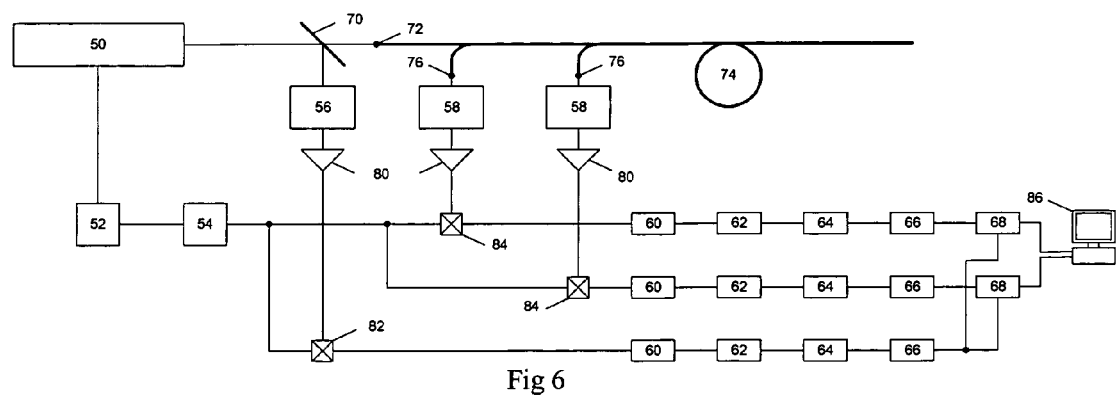
FIG. 6 is a diagram of a system for measuring characteristics of optical fiber in accordance with one embodiment of the present invention.

FIG. 6 is a diagram of a system for measuring characteristics of optical fiber in accordance with one embodiment of the present invention. A first frequency generator 52 is shown producing a first signal that directly modulates a laser 50. In alternative embodiments the output of the laser can be directed to an external modulator that is driven by the first signal. The first signal has a frequency that varies with time. In one embodiment the signal of FIG. 3 is used to modulate the amplitude of the laser 50. A splitter 70 reflects a reference signal and transmits an interrogation signal. The interrogation signal is directed into an entrance 72 coupled to an optical fiber 74. Radiation backscattered from the fiber 74 exits 76 the fiber. In one embodiment a PIN diode 56 converts the reference signal to a detected reference signal. In an alternative embodiment, the detected reference signal is replaced by a copy of the first signal. The detected reference signal, like the first signal, is electronic rather than optical. An avalanche photo diode 58 converts the backscattered radiation into a detected backscattered signal. Each of the detected signals are coupled to an amplifier 80.

A second frequency generator 54 is phase-locked to the first frequency generator 52 such that a second signal is produced that has a fixed frequency offset from the first signal. In one embodiment that fixed frequency offset is 10 kilohertz. The first mixer 84 receives the amplified detected backscattered signal as one input and the second signal as another. It outputs a first mixed signal. The second mixer 82 receives the amplified detected reference signal, or first signal copy, as one input and the second signal as another. It outputs a second mixed signal. The first and second mixed signals are coupled to a low pass filter 60 to remove high frequency components. The mixed signals are then digitized by analog-to-digital converters 62. The digitized signals are fed to fast fourier circuits 64 to be transformed to the frequency domain. In an alternate embodiment, the fast fourier operation could be accomplished in software rather than hardware. The offset frequency domain signal, 10 kilohertz in this embodiment, of each of the digitized frequency domain signals is captured in the peak capture circuit 66. The offset frequency contains the modulation information. A divider circuit 68 divides the captured offset frequency of the first mixed signal by the captured offset frequency of the second mixed signal and provides the result to a processor 86. In an alternate embodiment, the captured offset frequency of the first mixed signal can be divided by the captured offset frequency of the second mixed signal in software. The processor 86 determines characteristics of the optical fiber 74 from the received signals as expressed in the divider output. In another embodiment, a second detector 58 is positioned to receive radiation backscattered by the optical fiber 74 in response to the coupled excitation signal and sensitive to a different spectrum of backscattered radiation frequencies than the first detector.

Taking γ=0 in the chirped frequency response of Eqn. 11 yields an expression for the complex mixed signal of the form $$\hat{M}(k) = A\int_0^L e^{-2\alpha l}\sigma(l)e^{i2\pi kl}\,dl. \qquad \text{Eqn. 28}$$

In this case, the conditions of Eqn. 15 for bookmatching are met exactly. If data is collected by stepping the laser modulation through equally spaced frequencies, and if the conditions of Eqn. 24 and Eqn. 25 are met, then the discrete Fourier transform of the sampled, mixed signal, yields Eqn. 26 or Eqn. 27.

Although the present disclosure has been described in detail, it should be understood that various changes, substitutions and alterations can be made thereto without departing from the spirit and scope of the invention as defined by the appended claims.

What is claimed is:

1. A system for measuring optical characteristics comprising:
   a laser producing an excitation signal, wherein the laser is not a pulsed laser;
   a first frequency generator producing a first signal and a second frequency generator producing a second signal, wherein the second frequency generator is phase-locked to the first frequency generator such that the second signal has a fixed frequency offset from the first signal;
   a single-mode optical fiber coupled to the laser so that a coupled excitation signal is introduced into the optical fiber, wherein the coupled excitation signal is a continuous wave signal modulated at variable frequencies; and
   a first detector positioned to receive radiation backscattered by the optical fiber in response to the coupled excitation signal.

2. The system of claim 1, further comprising a second detector positioned to receive radiation backscattered by the optical fiber in response to the coupled excitation signal and sensitive to a different spectrum of backscattered radiation frequencies than the first detector.

* * * * *